(12) United States Patent
Garcia

(10) Patent No.: US 8,653,685 B2
(45) Date of Patent: Feb. 18, 2014

(54) METHOD AND CONTROL ARRANGEMENT FOR CONTROLLING CENTRAL CAPACITORS IN WIND POWER PLANTS

(75) Inventor: Jorge Martinez Garcia, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/701,557

(22) PCT Filed: May 31, 2011

(86) PCT No.: PCT/DK2011/050184
§ 371 (c)(1),
(2), (4) Date: Dec. 3, 2012

(87) PCT Pub. No.: WO2011/150932
PCT Pub. Date: Dec. 8, 2011

(65) Prior Publication Data
US 2013/0076037 A1 Mar. 28, 2013

Related U.S. Application Data

(60) Provisional application No. 61/353,668, filed on Jun. 11, 2010.

(30) Foreign Application Priority Data

Jun. 3, 2010 (DK) .................................. 2010 70240

(51) Int. Cl.
| | | |
|---|---|---|
| F03D 9/00 | (2006.01) | |
| H02P 9/04 | (2006.01) | |
| G05F 5/00 | (2006.01) | |
| G05D 3/12 | (2006.01) | |

(52) U.S. Cl.
USPC ............. 290/44; 323/207; 323/210; 323/211; 700/287

(58) Field of Classification Search
USPC .............. 290/44; 323/207, 210, 211; 700/287
See application file for complete search history.

(56) References Cited

U.S. PATENT DOCUMENTS

| | | | | | |
|---|---|---|---|---|---|
| 4,359,678 | A | * | 11/1982 | Raivola et al. ................ | 323/211 |
| 4,565,929 | A | * | 1/1986 | Baskin et al. .................... | 290/44 |
| 4,567,424 | A | * | 1/1986 | Dobsa et al. .................. | 323/210 |
| 4,999,565 | A | * | 3/1991 | Nilsson ......................... | 323/210 |
| 5,343,139 | A | * | 8/1994 | Gyugyi et al. ................ | 323/207 |
| 5,351,181 | A | * | 9/1994 | Brennen et al. ................ | 363/71 |

(Continued)

OTHER PUBLICATIONS

Paserba J J, IEEE "Secondary voltage-Var controls applied to static compensators (STATCOMs) for fast voltage control and long term Var management", 2002 IEEE Power Engineering Society. Summer Meeting. Chicago, IL Jul. 21-25, 2002.

(Continued)

Primary Examiner — Pedro J Cuevas
(74) Attorney, Agent, or Firm — Patterson & Sheridan, LLP

(57) ABSTRACT

The present invention relates to a control system and an associated method for controlling an amount of reactive power delivered from a wind power plant to an associated power supply grid, the control system comprising a wind power plant controller and a number of wind turbine controllers each being in communication with said wind power plant controller, wherein the wind power plant controller is adapted to provide a grid voltage reference in response to a required total amount of reactive power to at least one wind turbine controller and operating a Switched Capacitor bank.

7 Claims, 4 Drawing Sheets

(56) References Cited

U.S. PATENT DOCUMENTS

| | | | | |
|---|---|---|---|---|
| 5,402,057 | A | 3/1995 | D'Aquila et al. | 323/211 |
| 5,541,498 | A * | 7/1996 | Beckwith | 323/211 |
| 5,646,512 | A * | 7/1997 | Beckwith | 323/257 |
| 5,698,969 | A * | 12/1997 | Gyugyi | 323/207 |
| 5,751,138 | A * | 5/1998 | Venkata et al. | 323/207 |
| 5,798,634 | A * | 8/1998 | Terada et al. | 323/207 |
| 5,841,267 | A * | 11/1998 | Larsen | 323/215 |
| 6,121,758 | A * | 9/2000 | Bellina et al. | 323/211 |
| 6,411,067 | B1 * | 6/2002 | Bjorklund | 323/207 |
| 6,924,565 | B2 * | 8/2005 | Wilkins et al. | 290/44 |
| 6,963,187 | B2 * | 11/2005 | Bebic et al. | 323/207 |
| 7,081,689 | B2 * | 7/2006 | Tilscher et al. | 290/44 |
| 7,095,597 | B1 | 8/2006 | Cousineau | 361/20 |
| 7,312,537 | B1 * | 12/2007 | Walling et al. | 290/44 |
| 7,321,834 | B2 * | 1/2008 | Chu et al. | 702/60 |
| 7,397,143 | B2 * | 7/2008 | Walling | 290/44 |
| 7,432,609 | B2 * | 10/2008 | Obayashi et al. | 290/40 C |
| 7,505,833 | B2 * | 3/2009 | Delmerico et al. | 700/291 |
| 7,606,638 | B2 * | 10/2009 | Fortmann et al. | 700/287 |
| 7,804,280 | B2 * | 9/2010 | Deaver et al. | 323/210 |
| 7,813,884 | B2 * | 10/2010 | Chu et al. | 702/61 |
| 7,839,024 | B2 * | 11/2010 | Cardinal et al. | 307/84 |
| 7,923,862 | B2 * | 4/2011 | Cardinal et al. | 307/57 |
| 8,138,637 | B2 * | 3/2012 | Herold et al. | 307/148 |
| 8,174,138 | B2 * | 5/2012 | Castelli Dezza et al. | 290/44 |
| 8,203,856 | B2 * | 6/2012 | Radbrandt | 363/35 |
| 8,249,852 | B2 * | 8/2012 | Thulke | 703/18 |
| 8,290,634 | B2 * | 10/2012 | Larsen et al. | 700/287 |
| 8,527,104 | B2 * | 9/2013 | Arinaga et al. | 700/287 |
| 8,536,722 | B1 * | 9/2013 | Wakasa et al. | 290/44 |
| 2005/0015182 | A1 * | 1/2005 | Bebic et al. | 700/286 |
| 2005/0040655 | A1 | 2/2005 | Wilkins et al. | 290/44 |
| 2005/0194787 | A1 * | 9/2005 | Tilscher et al. | 290/8 |
| 2010/0109447 | A1 | 5/2010 | Achilles et al. | 307/153 |
| 2010/0114388 | A1 * | 5/2010 | Ooi et al. | 700/287 |
| 2010/0327599 | A1 * | 12/2010 | Nielsen et al. | 290/55 |
| 2012/0101640 | A1 * | 4/2012 | Stapelfeldt | 700/287 |
| 2013/0181532 | A1 * | 7/2013 | KJR | 307/82 |

OTHER PUBLICATIONS

Martinez et al., "Design and coordination of a capacitor and on-load tap changer system for voltage control in a wind power plant of doubly fed induction generator wind turbines", Wind Energy, May 26, 2011 pp. 1-17.

European Patent Office, Search Report and Written Opinion issued in related International application No. PCT/DK2001/050184 dated Mar. 5, 2012.

Martinez, et al., "Centralized Slope Voltage Control for a DFIG Wind Power Plant with STATCOM and Capacitor Banks", May 28, 2010.

* cited by examiner a)

b)

US 8,653,685 B2

METHOD AND CONTROL ARRANGEMENT FOR CONTROLLING CENTRAL CAPACITORS IN WIND POWER PLANTS

FIELD OF THE INVENTION

The present invention relates to a method for controlling a capacitor or reactor in a wind power plant, with at least one wind turbine generator, the invention also relates to wind power plant wherein there is a controller for a capacitor or reactor.

BACKGROUND OF THE INVENTION

With increasing penetration of wind power generation, the requirements for the connection of Wind Power Plants (WPP) to the electrical grid are defined by new and emerging grid connection codes. The grid connection requirements vary in different parts of the world, but they share common aims, like to permit the development, maintenance and operation of a coordinated, reliable and economical transmission or distribution system. Wind power plants differ from other traditional generation sources; thus, they are particular in certain aspects of their control and layout. Therefore, replacing traditional power plants, including their control characteristics, during periods of strong wind could be a concern. Grid operators are solving this challenge by means of redacting specific sections in the grid codes for WPP performance.

The new requirements generally demand that wind power plants provide ancillary services to support the network in which they are connected. In the present case, voltage regulation is of interest, and has been introduced recently by some grid operators. Voltage regulation with wind power plants entails the integration of all the available control devices installed at substations and plant.

Normally, the requirements of the utilities can be solved by the turbines and the park controller. When the wind turbines are not enough to fulfill the grid code requirements, then reactive power compensation equipment should be installed. This equipment could be static compensators if the plant needs more voltage dynamic capability, mechanical switching capacitors/reactors if the requirement is related to steady state performance, or just simply it could be a combination of both. The adoption of each one of the possible solutions, and choosing the method and combination of components for voltage regulation is one of the design decisions. The prevalent position is minimizing the cost of investments while offering the fulfillment of the requirements.

WPPs are composed by a large number of generation units, thus introducing communication delays in the plant control when processing the data and these could be in the range of hundreds of milliseconds.

The reactive power and voltage control of the wind turbines is relatively fast, with characteristic time constants in tens of milliseconds, the reactive power and voltage control of the central plant control is somewhat slower, with characteristic time constants in a range of hundreds of milliseconds, and this is used for voltage control in the agreed node in the transmission system in accordance with the requirements of the grid codes. As voltage control is actuated by reactive power from the turbines, it is possible to affirm that the voltage control design will cover an inner reactive power/voltage control loop, located at turbine level, and an outer voltage control loop, located at the Point of Common Coupling (PCC) where it is intended to control the voltage.

It may be seen as an object of embodiments of the present invention to provide a method and a control arrangement for controlling a reactive power source.

SUMMARY OF THE INVENTION

This Summary is provided to introduce a selection of concepts in a simplified form that are further described below in the Detailed Description.

This Summary is not intended to identify key features or essential features of the claimed subject matter, nor is it intended to be used as an aid in determining the scope of the claimed subject matter.

The above-mentioned object is complied with by providing, in a first aspect, a method for controlling at least one capacitor or reactor in a wind power plant, with at least one wind turbine generator, the method comprises the steps of:
calculate a reactive power value, based on an electrical grid reference value,
define a reactive power operation range of at least one power converter in the wind power plant,
connect or disconnect the at least one capacitor or reactor, when a reactive power value is outside the reactive power operation range.
subtract the reactive power of the connected capacitor or reactor from the total calculated reactive power value,
dispatch a wind turbine generator voltage reference, to the at least one wind turbine, based on the subtraction.

An advantage of this embodiment is that the connection/disconnection of the passive devices is upon the location of the calculated reactive power in the inductive or capacitive area.

An advantage of the subtracting the reactive power of the connected device from the total calculated reactive power, thus minimizing the transient in the control system.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
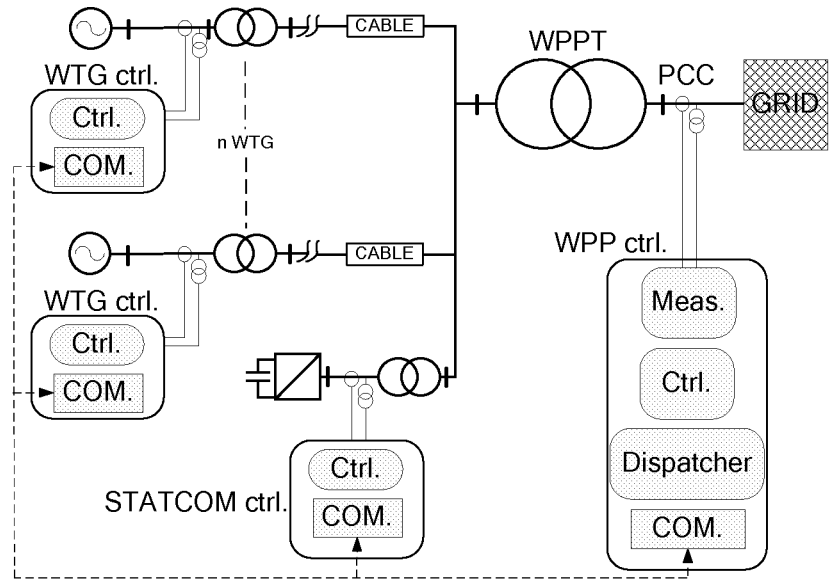
FIG. 1 shows a WPP diagram.

FIG. 1 shows a WPP controller for controlling the characteristics of the power injected at the PCC. Therefore, a centralized plant controller (WPP ctrl.) is needed to supervise the power injected at PCC. The plant controller receives the references and feedback (measurements) and outputs the turbine set-points. The plant controller is formed by a measurement device, which senses the currents and voltages at the PCC, a dedicated computer which allocates the control algorithms, and a communication hub. The communication hub will exchange control references and other signals with a large amount of WTGs (WTG ctrl.) using the communication WPP Ethernet network and particular protocols.

Still referring to FIG. 1 the dispatcher of the WPP controller has the functionality of splitting the reference calculated by the WPP controller into the different power generating units constituting the WPP. The way of splitting the reference can be done following several strategies, e.g. minimization of lost of energy production. One strategy could be to use a static synchronous compensator (STATCOM) as a reactive power back-up for the system in case the reactive power injected by the WTGs is not sufficient for grid code fulfillment.

A brief description of the DFIG will be given in the following. Referring to FIG. 2a, the DFIG allows full control of generator active and reactive power using the rotor-connected frequency converter. Its rating is typically in the order of 0.3 pu. Operating both with sub- and super-synchronous speed, the power can be fed both in and out of the rotor circuit. The rotor-connected converter can employ various power dissipation solutions during severe transients. These solutions mat involve an active crowbar, which is located at the rotor terminals, or a chopper in the DC link, $R_{ch}$—cf. FIG. 2a. The grid converter is used to regulate the voltage level of the DC link.

A simplified control diagram of the DFIG controller is depicted in FIG. 2b where the active power, P, and reactive power, Q, are controlled using the d and q axis, respectively. The DFIG controller calculates or receives power references, $P_{ref}$, $Q_{ref}$, from an external controller. These power references are processed using two PI-controllers in cascade; and they will generate the needed voltage references, $V_{d\ ref}$, $V_{q\ ref}$, which are translated by the PWM to pulse the rotor converter. Finally, the rotor is fed with a voltage that produces the desired P and Q at the stator terminals.

Figure 3:
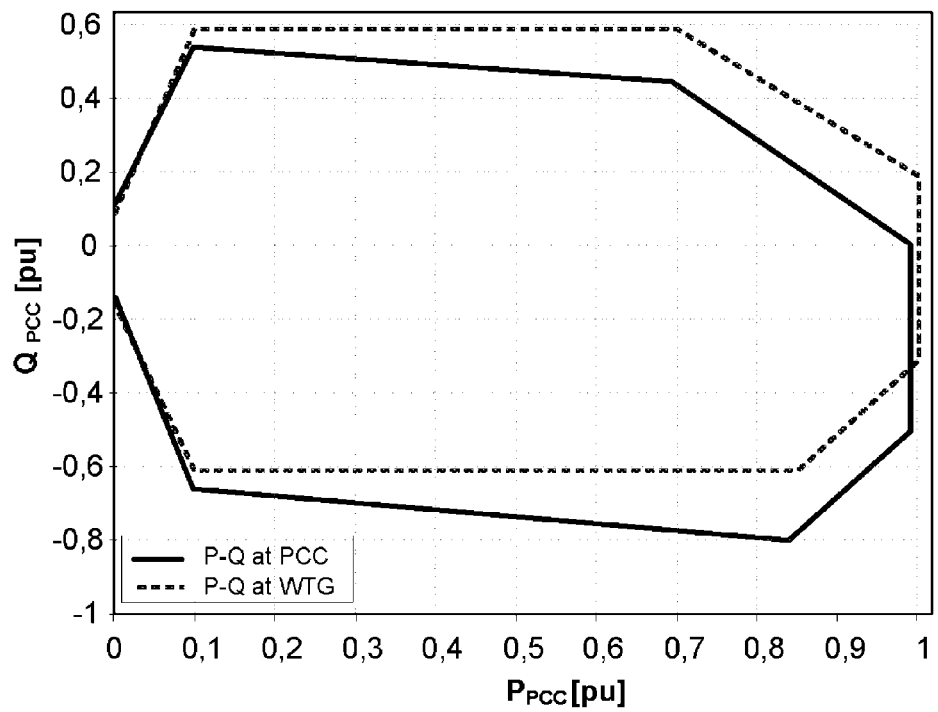
FIG. 3 shows load analysis at PCC.

Most of the grid codes for operating modern wind power plant connected to an electrical asks for having a voltage capability regulation within a minimum power factor between 0.9 or 0.95, for the whole active power range. As can be seen in FIG. 3, for a wind turbine generator equipped with a doubly fed induction generator, the limited Q injection for high active power productions implies not fulfilling this requirement. In order for this situation to be solved some reactive power compensation equipment should be installed in the wind power plant.

FIG. 3 shows the P-Q chart obtained at generator stator terminals (dotted line) and the P-Q chart obtained at the PCC (solid line). It can be seen how, at PCC, the reactive power losses decrease the capacitive reactive power, consequently the inductive power capability at PCC is increased.

Voltage regulation including static converters, e.g. Wind turbines with DFIG or full scale converters (wind turbine generators where all the power is converted through a power converter) or STATCOMs, are viewed primarily as a fast reactive power source (VAr) to counteract rapid and unexpected voltage disturbances. In order to fulfill this requirement, it is necessary to ensure that the compensator will have sufficient VAr capacity to handle unpredictable disturbances; for this reason normally the WPPs include switchable capacitor (MSCs) and reactor banks (MSRs) for keeping converters dynamic capability to the maximum. It should be noted that the operations of these switchable components are considered as a way to offset the operation level not as a voltage regulation itself, whereas the static converters operate more as a voltage regulation mean.

The MSCs strategy proposed in this idea is basis on the idea that the steady state operation of the Q injected by the converters is inside the range ±0.1 pu (as an example) in this way the sizing of the capacitor banks and its control is designed accordingly. One should realized that the bigger the range, the lower the amount of switching operation for the MSCs, but the bigger the switching energy losses annually from the static converters supplying the reactive power. The inductive operation area of the MSRs are may not be included, since the power converter of the wind turbine generators by themselves reach more than the needed maximum operation point at the PCC, when the wind turbines are equipped with DFIG generators, and just with an operation of 0.1 pu inductive can almost reach the maximum required. This might not be the case with other types of generators in the wind turbines, here other factors also play a role, such as cabling, transformers etc.

Figure 4:
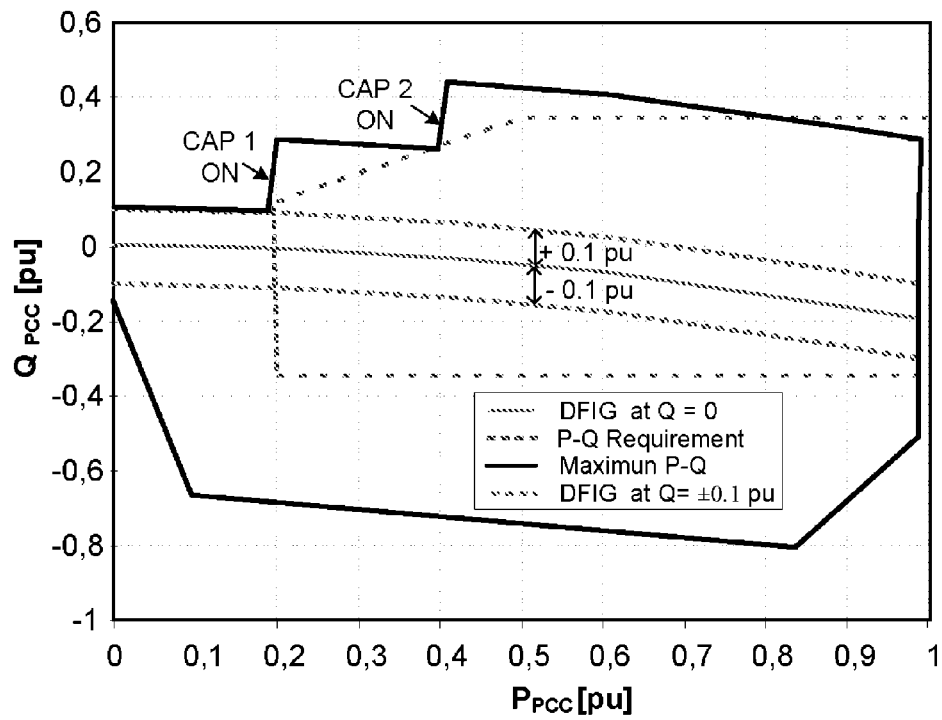
FIG. 4 shows load analysis at PCC according to the present invention.

FIG. 4 shows; with a solid line the combined operation of the DFIG and the MSCs in the capacitive area, and in the inductive only DFIG operation, with the dotted dark gray line is shown the grid code P-Q requirements at PCC, and the dotted light gray lines are showing the P-Q obtained when the DFIG are operating at 0.1 pu capacitive and inductive, the solid light gray line shows the P-Q obtained when the DFIG is operating PF=1 at generator terminals.

The amount of capacitor steps can be adapted to as many as wanted; having two steps (CAP1 and CAP2) is just for the sake of simplification. The controller could be programmed to have several ranges of operations instead of one. FIG. 4 shows only one band for the full plant operation(green dotted line).

These ranges could be triggered by different voltage levels, wind level, or by different active power level injections. Having for example smaller ranges for high power, 0.05 pu and bigger for low power 0.1 pu. Since more power fluctuations is expected in this area.

It should be noted that this concept can be applied to other kind of WTG topologies, including WTGs with full scale power converters.

Figure 5:
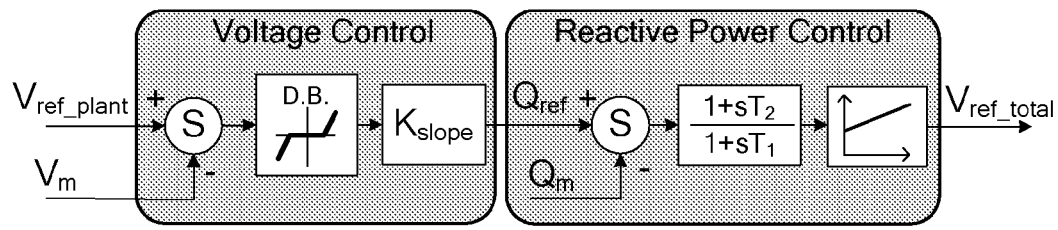
FIG. 5 shows WPPC, secondary slope voltage control concept.

FIG. 5 shows a generic voltage control implemented in the wind power plant controller. It should be mentioned that where Vref_total is mentioned, one could say Qref_total instead, although without the appropriate calculations from voltage to reactive power. This means that, the output of the controller can be calculated in terms of voltage or reactive power reference indistinctly. Vref_total is the voltage reference of the wind power plant. Vref_plant is often given by the transmission system operator or by wind power plant operator, basically it is the external reference to the plant control.

Figure 2:
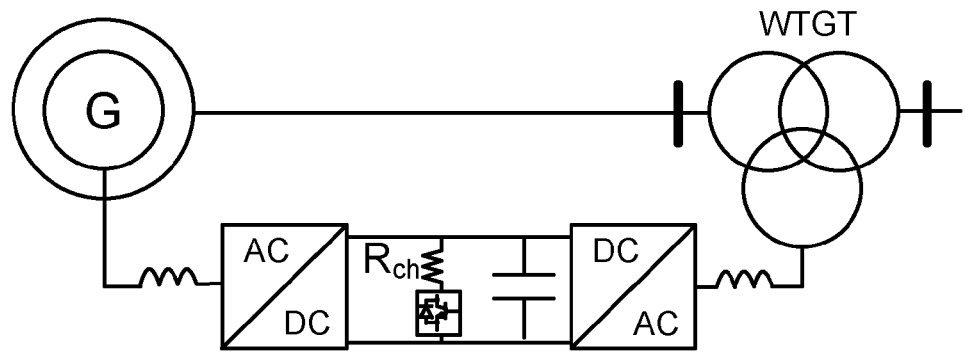
FIG. 2a shows a DFIG diagram.
FIG. 2b shows a simplified control diagram of the DFIG controller.
Figure 2:
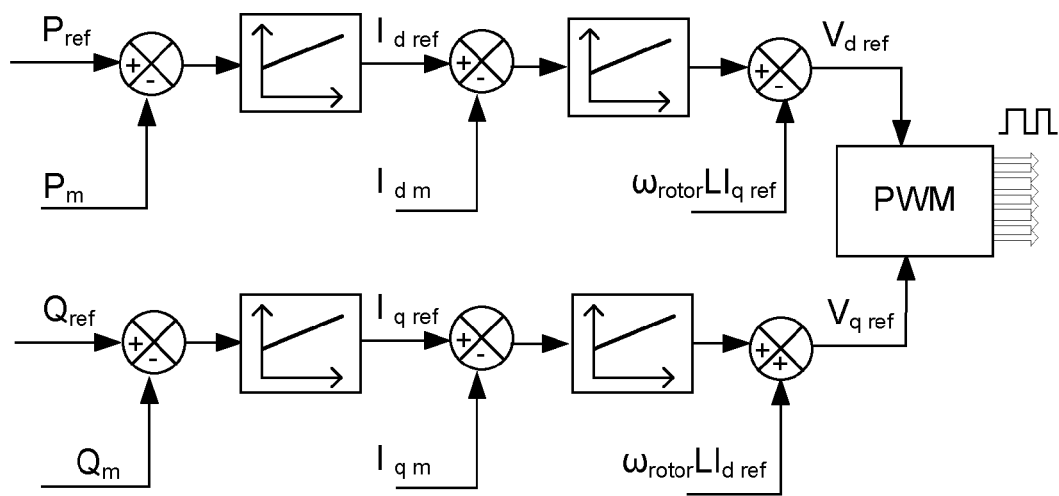

Vref is calculated according to FIG. 2, consisting of a d and q component, where as the Vref_total is calculated by the wind power plant controller.

The mentioned control strategy calculates the total reference (Vref_total) to be outputted by the WPP components, where the components often comprises wind turbine generators, STATCOMs, MSCs and perhaps MSRs. Before this reference is sent to them, it is altered by the capacitor control, which may subtract/add a fraction to the reference (ΔVCap) if one of the capacitor steps is going to be connected/disconnected. After this the reference is processed in the dispatcher block, which splits the calculated reference among the WTGs and STATCOM, according to the injected active power.

Figure 6:
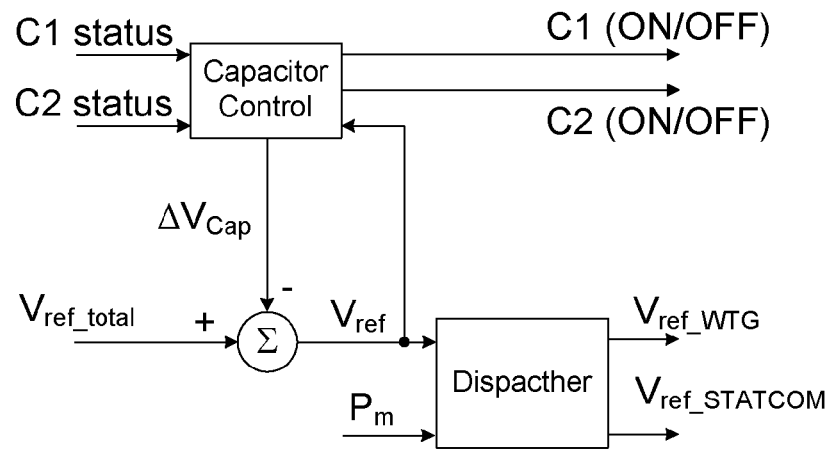
FIG. 6 shows WPPC, secondary slope voltage control concept.

The Capacitor control strategy suggested by the present invention is depicted in FIG. 6. The capacitor control strategy works in a way where a voltage reference Vref_WTG is dispatched to each turbine and another voltage ref, Vref_STATCOM is dispatched to the STATCOM if present, and then they respond by supplying reactive power accordingly.

The control strategy of the present invention uses the previous calculated Vref to calculate the needed Q by using equation 1.

$$(1-V_{ref})K_{WTG}=I_{qWTG}\approx Q_{WTG}=Q_{ref\_cap} \quad \text{Equation 1}$$

In the case that the wind power plant controller is calculating voltage references, to calculate what will be the reactive power injected by each wind turbine generator (WTG), the K_WTG gain is used (K_WTG is the voltage slope gain of the WTG control), one have to take into account that when the reference calculated by the wind power plant is calculated, in terms of reactive power reference, no translation is needed. The same would also apply to a STATCOM.

If the control is working in "per unit" (as it is in the schemes), the Iqwtg, in Equation 1, is the total of all of them, if the control is working in real units, Iqwtg will be the reactive current of only one wind turbine, it is therefore needed to multiply by the total amount of WTG on line to get the total reactive power of the wind power plant.

The Qref_cap reference is compared with some threshold value (Converter operation steady-state, which defines the maximum level of the converters is going to be used for reactive power generation), if the reference is greater than this level, then the output is set to Qref_cap, otherwise remain 0. The next block (Switching Logic), processes this signal and decided which step to connect/disconnect basis on some timer functions and the current status of the capacitors. The outputs of the block are the switching commands to turn on or off of capacitor bank 1 (C1) or capacitor bank 2 (C2) and the ΔVCap offset.

Attention should be drawn to the input reference connected to the Capacitor Control (Vref instead of Vref_total), this ensure that the processed Vref is the one related to the operation of the WTGs and a STATCOM.

Figure 7:
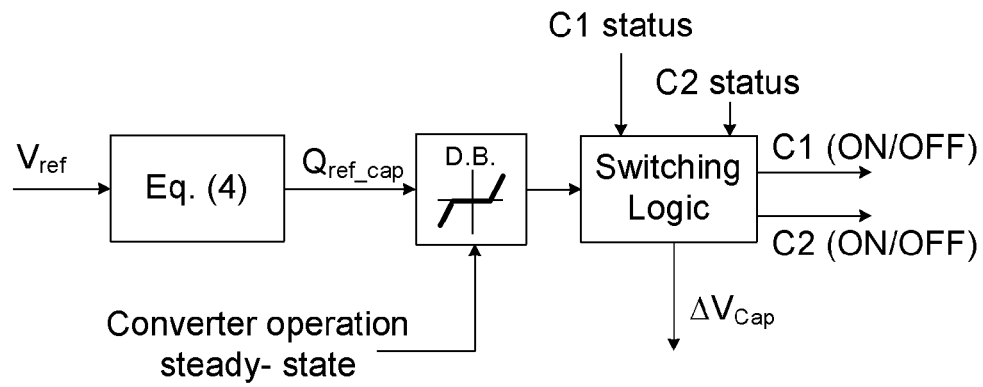
FIG. 7 shows capacitor control according to the present invention.

FIG. 7 shows the details of the box, called Capacitor control, in FIG. 6.

The effect of the present embodiment gives a ΔVCap offset compensation which is to center the disturbance of the capacitor connection, thus decreasing the peak value of the transient. The action of the ΔVCap offset can be disabled in some situations, such as when disconnecting the capacitors, and when the measured voltage is greater than a certain percentage of nominal voltage, for example 1.08 pu, and when connecting capacitors and the voltage is below a certain percentage of nominal voltage, for example 0.92 pu. In these situations it is better not to center the transient, in order to avoid increasing/decreasing the voltage even more.

In summary the invention relates to, a control system and an associated method for controlling a capacitor/reactor bank for delivering an amount of reactive power delivered from a wind power plant to an associated power supply grid, keeping the reactive power output of the wind turbines/STATCOM within a maximum operation band, the control system comprising a wind power plant controller and a number of wind turbine controllers each being in communication with said wind power plant controller, wherein the wind power plant controller is adapted to provide a grid voltage reference in response to a required total amount of reactive power to at least one wind turbine controller and operating a Switched Capacitor bank.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for controlling at least one capacitor or reactor in a wind power plant, the wind power plant comprising at least one wind turbine generator, the method comprising:
    calculating a reactive power value based on an electrical grid reference value;
    defining at least one maximum reactive power operation range of at least one power converter in the wind power plant;
    connecting or disconnecting the at least one capacitor or reactor when a reactive power value is outside the at least one reactive power operation range;
    subtracting the reactive power of the connected capacitor or reactor from the total calculated reactive power value; and
    dispatching a wind turbine generator voltage reference to the at least one wind turbine based on the subtraction.

2. The method of claim 1, wherein the electrical grid reference value is a voltage reference.

3. The method of claim 1, wherein the electrical grid reference value is a reactive power reference.

4. The method of claim 1, wherein the wind power plant further comprises at least one STATCOM and wherein a STATCOM voltage reference based on the subtraction is dispatched to the STATCOM.

5. The method of claim 1, wherein a plurality of maximum reactive power operation ranges are defined for the at least one power converter, and comprising:
    selecting one of the maximum reactive power operation ranges as the least one maximum reactive power operation range based on injected power at point of connection or wind speed.

6. The method of claim 5 wherein selecting one of the maximum reactive power operation ranges comprises:
    if the injected power at the point of connection is less than 20%, setting the least one maximum reactive power operation range to 20%; and
    if the injected power at the point of connection is greater than 20% and less than 70%, setting the least one maximum reactive power operation range to 15%; and
    if the injected power at the point of connection is greater than 70%, setting the least one maximum reactive power operation range to 10%.

7. A wind power plant comprising:
    a wind turbine generator including at least one power converter;

at least one capacitor or reactor; and a central control unit, said central control unit configured to:

calculate a reactive power value based on an electrical grid reference value;

define at least one maximum reactive power operation range of the at least one power converter in the wind power plant;

connect or disconnect the at least one capacitor or reactor, when a reactive power value is outside the reactive power operation range;

subtract the reactive power of the connected capacitor or reactor from the total calculated reactive power value; and dispatch a wind turbine generator voltage reference to the at least one wind turbine based on the subtraction.

* * * * *